US009253725B2

(12) United States Patent
Ise

(10) Patent No.: US 9,253,725 B2
(45) Date of Patent: Feb. 2, 2016

(54) COMMUNICATION TERMINAL, COMMUNICATION METHOD, AND COMPUTER READABLE MEDIUM

(71) Applicant: KABUSHIKI KAISHA TOSHIBA, Tokyo (JP)

(72) Inventor: Kotaro Ise, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 155 days.

(21) Appl. No.: 13/919,212

(22) Filed: Jun. 17, 2013

(65) Prior Publication Data

US 2014/0029496 A1    Jan. 30, 2014

(30) Foreign Application Priority Data

Jul. 25, 2012   (JP) .................................. 2012-165123

(51) Int. Cl.
*H04W 52/02*     (2009.01)
(52) U.S. Cl.
CPC .......... *H04W 52/0225* (2013.01); *H04W 52/02* (2013.01); *H04W 52/0212* (2013.01); *H04W 52/0251* (2013.01); *Y02B 60/50* (2013.01)
(58) Field of Classification Search
None
See application file for complete search history.

(56) References Cited

U.S. PATENT DOCUMENTS

| 6,377,790 | B1 * | 4/2002 | Ishii ........................... 455/343.1 |
| 8,483,779 | B2 | 7/2013 | Atsumi | |
| 8,654,737 | B2 * | 2/2014 | Shi et al. ........................ 370/331 |
| 2004/0255008 | A1 * | 12/2004 | Olsen et al. .................... 709/220 |
| 2005/0282573 | A1 | 12/2005 | Maeno | |
| 2007/0238437 | A1 * | 10/2007 | Jaakkola ..................... 455/343.1 |
| 2010/0153765 | A1 * | 6/2010 | Stemen et al. ................ 713/340 |

FOREIGN PATENT DOCUMENTS

| JP | 2000-307462 | 11/2000 |
| JP | 2006-005577 | 1/2006 |
| JP | 2009-110272 | 5/2009 |
| JP | 2009-218647 | 9/2009 |
| JP | 2012-39562 | 2/2012 |

OTHER PUBLICATIONS

Office Action mailed Jun. 10, 2014 in counterpart Japanese Application No. 2012-165123 and English-language translation thereof.
Irish et al., "A "Green TCP/IP" to Reduce Electricity Consumed by Computers", *Computer Science and Engineering*—University of South Florida, (No Date), pp. 303-305.

(Continued)

*Primary Examiner* — Christopher Crutchfield
(74) *Attorney, Agent, or Firm* — Nixon & Vanderhye, P.C.

(57) ABSTRACT

According to some embodiments, there is provided a communication terminal, including: a communication device, a connection processing unit, a device power managing unit and a device power managing unit. The communication device communicates with a network. The connection processing unit establishes a connection with a first communication terminal on the network. The communication managing unit detects a start and an end of a session on the connection. The device power managing unit controls feeding of power to the communication device in accordance with a detected result by the communication managing unit.

15 Claims, 11 Drawing Sheets

(56) References Cited

OTHER PUBLICATIONS

Irish et al., "A "Green TCP/IP" to Reduce Electricity Consumed by Computers", Southeastcon '98, Proceedings, IEEE, Apr. 24-26, 1998, pp. 302-305.

Office Action mailed Jan. 27, 2015 in counterpart Japanese Application No. 2012-165123 and English-language translation thereof.
Office Action mailed Apr. 17, 2015 in counterpart Japanese Patent Application No. 2012-165123 and English-language translation thereof.

\* cited by examiner

| SUBJECT | DATE | SENDER |
|---|---|---|
| THANK YOU | 17:40 | TANAKA |
| ANNOUNCEMENT | 16:30 | SUZUKI |
| REQUEST | 15:20 | YAMADA |
| REQUEST FOR ATTENDANCE | 11:40 | ITO |
| SORRY | 9:00 | MORI |
| ANNOUNCEMENT FOR Yahoo | 2/1 22:00 | service@yahoo.com |
| MESSAGE FROM Facebook | 2/1 21:00 | admin@facebook.com |
| RECEIVE YOUR ORDER | 1/31 1:10 | support@amazon.com |
| THANK YOU | 1/25 21:20 | TANAKA | https://mail.toshiba.co.jp/

61 RECEIVE
62 CREATE
63 INBOX
64 SENT

65: SCROLL BAR

FIG. 6

COMMUNICATION TERMINAL, COMMUNICATION METHOD, AND COMPUTER READABLE MEDIUM

CROSS REFERENCE TO RELATED APPLICATIONS

This application is based upon and claims the benefit of priority from the prior Japanese Patent Application No. 2012-165123 filed on Jul. 25, 2012, the entire contents of which are incorporated herein by reference.

FIELD

Embodiments described herein relate to a communication terminal, a communication method and a computer readable medium.

BACKGROUND

With the development in communication technology, a terminal such as a smartphone that has a communication function is in widespread use. Meanwhile, societal demands on reducing power consumption of terminals are increasing due to concern for global warming. Further, for a battery-powered terminal such as a smartphone, there is a need for reducing power consumption of the terminal from the standpoint of the convenience by increasing run time thereof.

In response to the demands for reducing power consumption, a framework named ACPI (Advanced Configuration and Power Interface) for power supply control is being proposed. According to the above, a state named "S3" is defined. The "S3" is a state that is called "Suspend to RAM." In the "S3" state, values in registers of a CPU are written out in a main memory, and feeding of power to the CPU, a bus, and a bus device is stopped while the main memory is kept in an energized state. A terminal in the "S3" state cannot carry out an operation, but power consumption thereof is smaller than in an "S0" state (an operating state). Further, when the terminal returns to the "S0" state from the "S3" state, the terminal can return to a state prior to transitioning to the "S3" state. Therefore, it is more convenient than a cold boot.

Further, as another related technique, the following can be cited. Suppose a user logs on to a remote terminal from a local terminal via telnet and carries out operations such as text creation or the like on the remote terminal. At this time, if the local terminal transitions to the "S3" state from the "S0" state, a TCP (Transmission Control Protocol) connection pertaining to the telnet session is disconnected by the remote terminal. Thus, when the local terminal returns to the "S0" state from the "S3" state, a problem occurs in that a text that has been created on the remote terminal is lost, and further, a problem occurs in that the user must operate to again log on to the remote terminal. The aforementioned another related technique is intended to solve these problems. That is, as the local terminal transmits a "TCP-SLEEP" message to the remote terminal when having transitioned to the "S3" state, the TCP connection is prevented from being disconnected by the remote terminal.

Further, according to another related technique, in a case where there is no receiving or transmitting packet for a pre-determined period of time in a wireless LAN terminal, information that is necessary to transmit data to a connected access point is stored in the terminal, and feeding of power to a communication circuit is stopped. When a transmitting packet is generated, power is fed to the communication circuit, and the packet is transmitted to the access point having been connected to previously using the stored information without carrying out a connecting procedure. In this way, by omitting the procedure to connect to the access point, a delay that is required for transmitting a packet after power is fed to a communication unit is reduced.

In recent years, services called Web services or cloud services have been in widespread use. For example, Gmail by Google Incorporated or the like can be cited. With Gmail, mail data are present on a server, and by accessing them from a Web browser, a list of received mail and content of selected mail are displayed without using a dedicated mail application. In a case where such a service is assumed, it is desirable from the standpoint of reducing power consumption that, each time the local terminal receives necessary data, the local terminal disconnects a TCP connection and stops feeding power to a communication section of the local terminal. For example, after received mail list data are acquired, the TCP connection is disconnected, and a received mail list screen is displayed. While a user is browsing through the received mail list screen, a control is carried out to stop feeding of power to the communication section. Then, when the user operates on the received mail list screen, power is fed to the communication section, and a TCP connection to a server is established. A request in accordance with that operation is then transmitted to the server, a response included in the response is received, and a screen is displayed using data included in that response.

However, if a TCP connection is reestablished each time a browser displaying the received mail list screen is operated in this way, a delay until a next screen is displayed on the browser increases due to overhead by a connection setup and a flow control called a slow start. Through this, convenience for the user decreases. This problem and a solution therefor are not described in the aforementioned another related technique. Further, in the aforementioned another related technique, since the entire local terminal stops operating in a power saving state (for example, "S3"), the user cannot operate the terminal in the power saving state, and thus there exists a problem in that the convenience is lost.

In addition, in the aforementioned yet another related technique, since an association with a wireless LAN access point is disconnected, the TCP connection is disconnected from the server. Accordingly, a problem that arises due to reestablishing a TCP connection cannot be solved.

BRIEF DESCRIPTION OF THE DRAWINGS

FIG. 6 shows an example of a received mail list screen;

DETAILED DESCRIPTION

According to some embodiments, there is provided a communication terminal, including: a communication device, a connection processing unit, a device power managing unit and a device power managing unit.

The communication device communicates with a network.

The connection processing unit establishes a connection with a first communication terminal on the network.

The communication managing unit detects a start and an end of a session on the connection.

The device power managing unit controls feeding of power to the communication device in accordance with a detected result by the communication managing unit.

Hereinafter, the present embodiment will be described with reference to the drawings.

Figure 1:
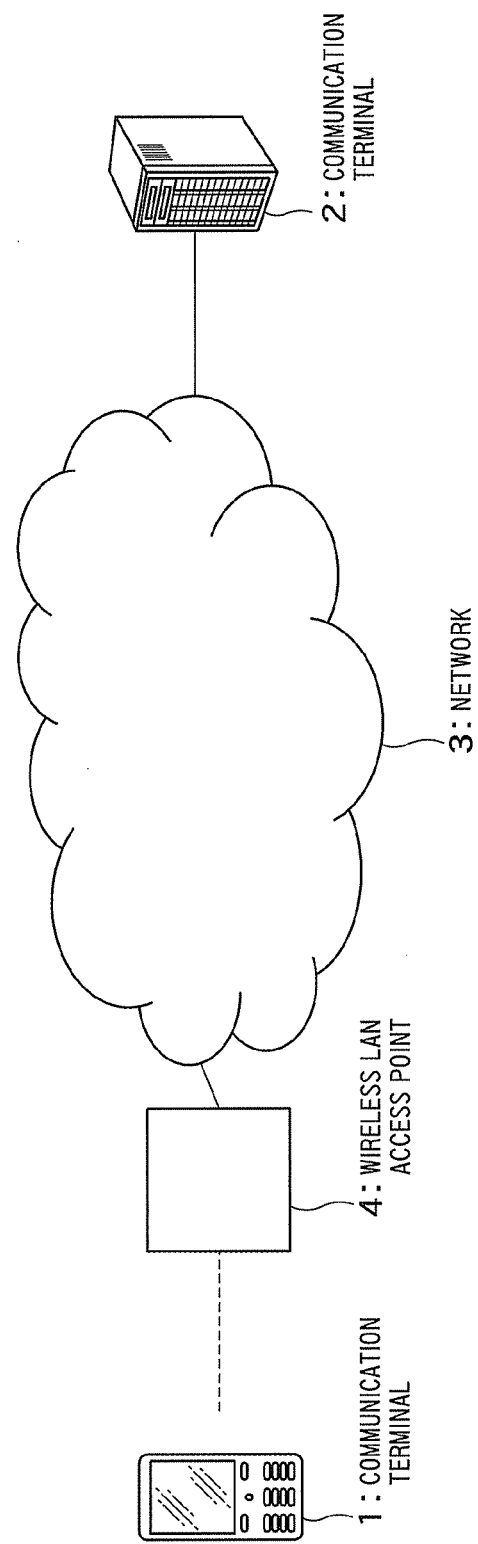
FIG. 1 shows an overall configuration in the present embodiment.

FIG. 1 shows an overall configuration in the present embodiment.

A communication terminal 1 and a communication terminal 2 that is a first communication terminal are connected to each other through a network 3. The communication terminal 1 is connected to the network 3 through a wireless LAN access point 4 via a wireless LAN (for example, IEEE 802.11). The communication terminal 2 is connected to the network 3 via 10 Gb Ethernet.

A Web browser is executed at the communication terminal 1, and an HTTP server is in operation at the communication terminal 2. A web mail service with HTTP is provided at the communication terminal 2, and this mail service is used from the communication terminal 1.

Figure 4:
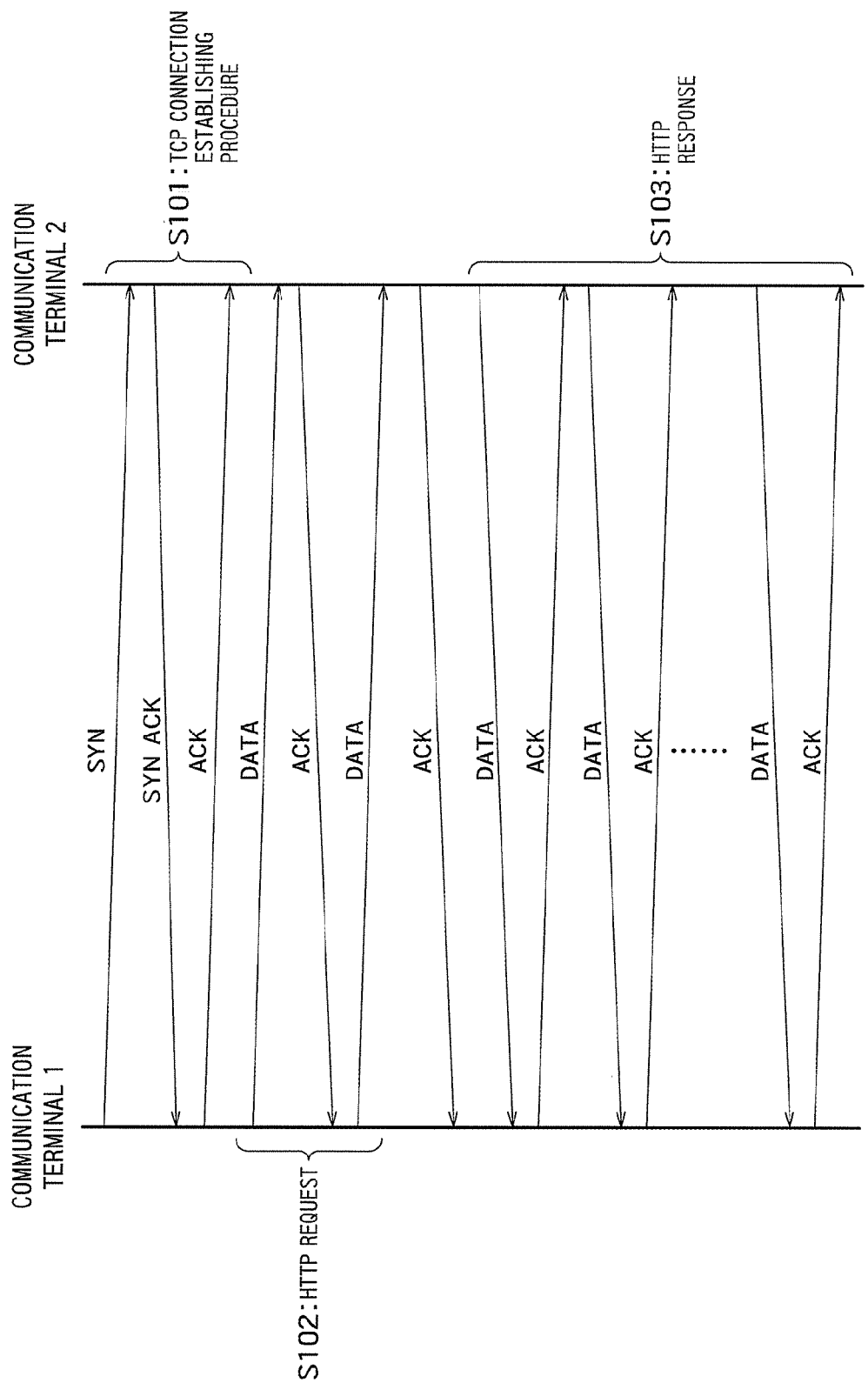
FIG. 4 depicts an example of communication sequence between the communication terminal according to the present embodiment and a communication terminal on a network.

FIG. 4 shows an example of communication sequence between the communication terminal 1 and the communication terminal 2. In FIG. 4, sequence of a TCP packet is shown.

First of all, the communication terminal 1 establishes a TCP connection to the communication terminal 2 via an address port number 80 (S101). A TCP connection establishing procedure at this time is as follows. (1) An "SYN" packet of TCP is transmitted from the communication terminal 1 to the communication terminal 2, (2) the communication terminal 2 that has received this "SYN" packet transmits an "SYN ACK" packet to the communication terminal 1, and (3) the communication terminal 1 that has received this "SYN ACK" packet transmits an "ACK" packet to the communication terminal 2.

Next, the communication terminal 1 transmits an HTTP request to the communication terminal 2 (S102). At this time, the HTTP request may be divided into a plurality of TCP packets in some cases. The communication terminal 2 that has received the HTTP request transmits an HTTP response to the communication terminal 1 (S103). The HTTP response may be divided into a plurality of TCP packets in some cases. The "ACK" in FIG. 4 is a delivery confirming packet that indicates that "DATA" has been received and has information (a confirmation response number of FIG. 10) on a segment size to identify received data.

Figure 5:
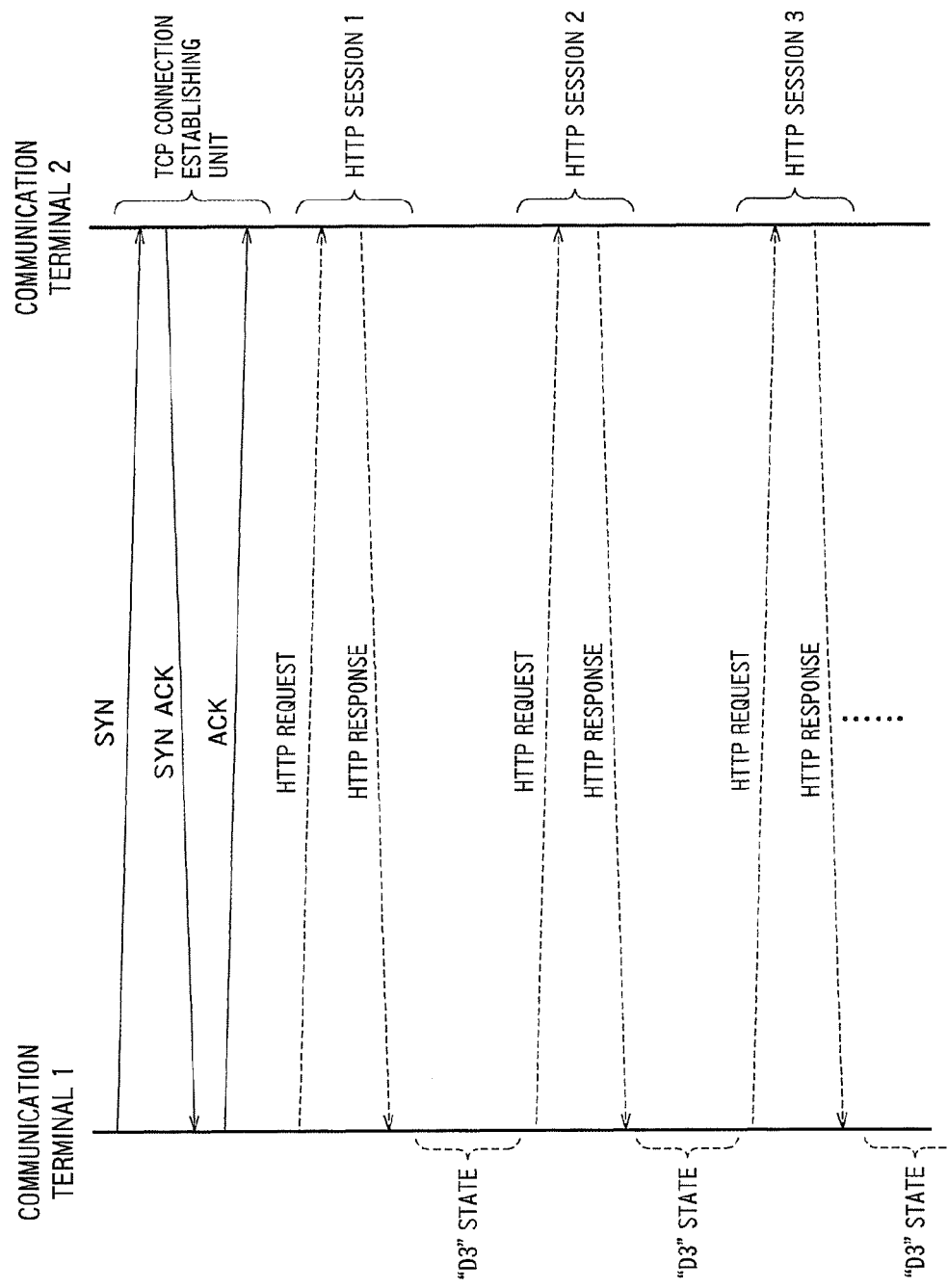
FIG. 5 depicts the communication sequence at an HTTP level.

FIG. 5 shows communication sequence at an HTTP level. In FIG. 5, solid arrows indicate transmission and reception of a TCP packet, and dotted arrows indicate transmission and reception of information at the HTTP level.

As mentioned above, each of the HTTP request and the HTTP response is carried via one or more TCP packet(s). Typically, in an HTTP response of a first HTTP session 1, the communication terminal 1 receives HTML data that corresponds to a user authentication screen. The HTML data that has been received via a Web browser that operates on the communication terminal 1 are shown to a user as a user ID and password input screen.

As the user inputs a user ID and a password in this screen and presses a transmit button, an HTTP session 2 is started. An HTTP request in the HTTP session 2 includes the user ID, the password, and a request URL (a URL requested by the HTTP request). The communication terminal 2 that has received this transmits, to the communication terminal 1, an HTTP response that includes HTML data for displaying a list of received mail of a corresponding user and user identification information to identify the user.

Further, as the user selects a certain mail on a received mail list screen, an HTTP session 3 is started. An HTTP request in the HTTP session 3 includes the user identification information to identify the user, mail identification information that corresponds to the mail which the user has selected, and the request URL. The communication terminal 2 that has received this transmits, to the communication terminal 1, an HTTP response that includes the user identification information and HTML data for displaying the mail that corresponds to the mail identification information.

FIG. 6 shows an example of the received mail list screen.

Upon receiving the HTML data that is included in the HTTP response in the HTTP session 2, the communication terminal 1 displays this on a screen using a Web browser. FIG. 6 is a display example thereof.

In this display example, the screen includes two frames. A receive button 61, a create button 62, an inbox button 63, and a sent button 64 are displayed in a left frame 51. Entries of (a subject, a received date, and a sender) that correspond to each of received mail are displayed in a right frame 52. Scrolling through the screen using a scroll bar 65 in the right frame makes it possible to display entries that do not fit within the screen.

Here, in order to acquire a plurality of HTML data for displaying a screen with two frames as in FIG. 6, it is typical to acquire data through a single HTTP session for each HTML data, and not through a single HTTP session as described in FIG. 5. However, in FIG. 5, in order to facilitate the description, the description is given based on an example where HTML data for a received mail list screen can be received through a single HTTP session.

For example, in the case of the screen in FIG. 6, first HTML data is acquired first, and two frames and URLs of embedded objects that correspond to the respective frames are indicated in the HTML data. The Web browser receives the HTML data (the embedded objects) for the right screen and the left screen in FIG. 6 through two HTTP sessions for the URLs of the embedded objects. Of course, the embedded object can be a variety of data such as image data, aside from the HTML data.

When the user selects an uppermost entry on the received mail list screen in FIG. 6, the communication terminal 1 receives HTML data via the HTTP session 3. A display example of a screen to be displayed with the HTML data is shown in FIG. 7.

Figure 7:
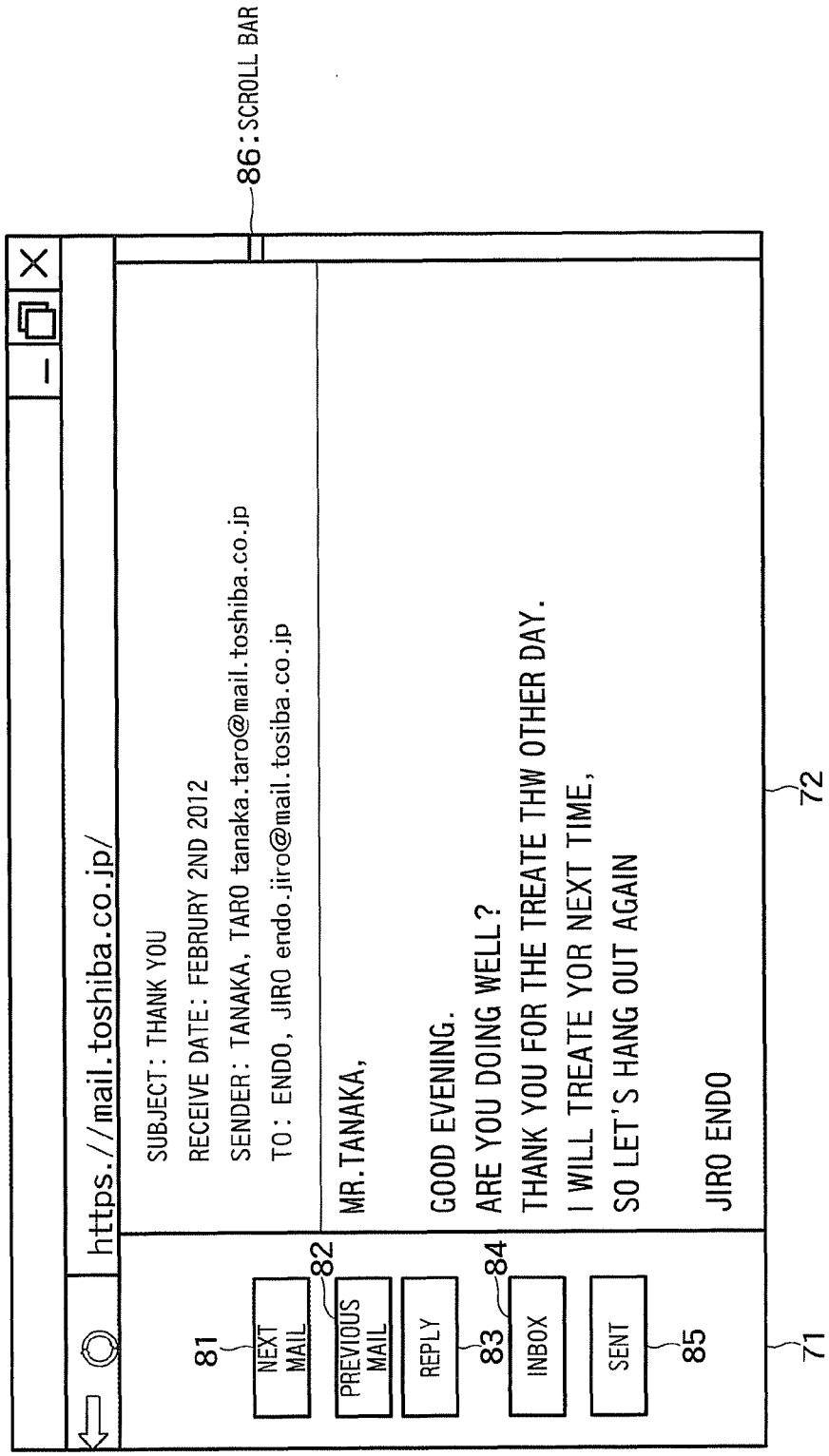
FIG. 7 shows a display example of a screen displayed through HTML data.

In the display example in FIG. 7, the screen includes two frames. A next mail button 81, a previous mail button 82, a reply button 83, an inbox button 84, and a sent button 85 are displayed in a left frame 71. Details of mail that corresponds to the mail which the user has selected are shown in a right frame 72. When a mail text is long and does not fit within the screen, scrolling through the screen using a scroll bar 86 in the right frame allows a portion outside the screen to be displayed.

While the user is reading the mail text in FIG. 7, communication between the communication terminal 1 and the communication terminal 2 does not occur. Since the screen data have all been acquired, even if the scroll bar is operated, for example, communication is not necessary. Thus, while the user is reading the mail (for example, for three minutes), it is possible to stop feeding power to the communication unit of the communication terminal 1 (the "D3" state after the HTTP session 3 in FIG. 5). The "D3" state is a state where feeding of power to the communication unit is stopped. In this way, by putting in the "D3" state while communication does not occur, operating power and leakage power in a communication circuit can be reduced, and power consumption of the communication terminal 1 can be reduced. Further, the communication terminal 1 can be put in the "D3" state, not only while the user is reading the mail, but also while the user inputs a user ID and a password in an authentication screen (between the HTTP session 1 and the HTTP session 2) and while the user is searching for a mail to read in the received mail list screen (between the HTTP session 2 and the HTTP session 3). This situation is shown in FIG. 5.

Figure 2:
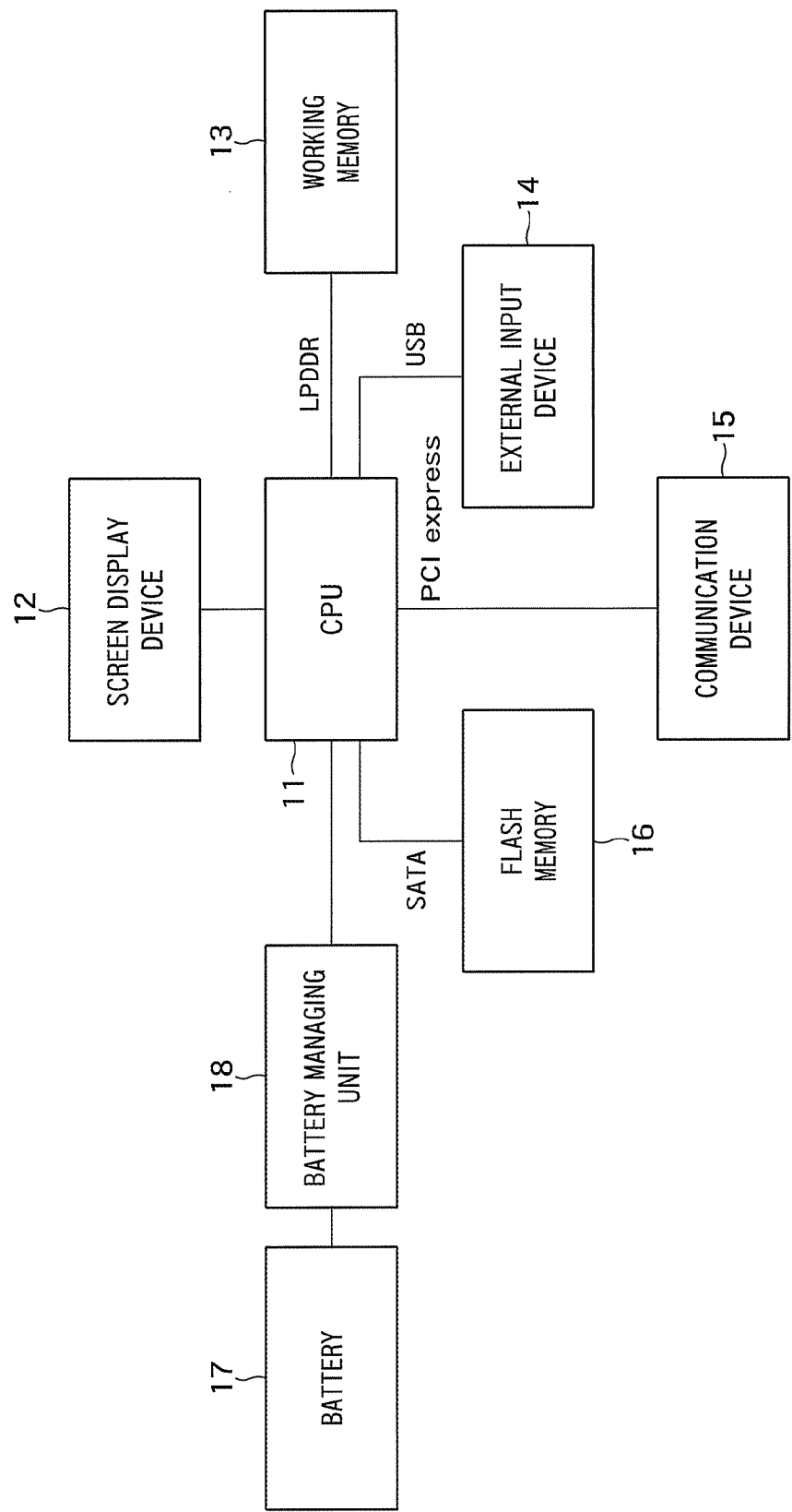
FIG. 2 shows a hardware configuration example of a communication terminal according to the present embodiment.

FIG. 2 shows a hardware configuration example of the communication terminal 1.

The communication terminal 1 includes a CPU 11, a display device 12, a working memory 13, an external input device 14, a communication device 15, a flash memory 16, a battery 17, and a battery managing unit 18.

The CPU 11, for example, is a processor such as Core i5 of Intel Corporation.

The display device 12 displays on a screen a screen display signal in a format that is visible to a human being, for example, as in an LCD display.

The working memory 13 is a memory such as a DRAM and is connected to the CPU 11, for example, via an LPDDR interface.

The external input device 14 is an input device such as a button, a touch panel, a keyboard, and a mouse and is connected to the CPU 11, for example, via a USB interface.

The communication device 15, for example, operates in accordance with wireless LAN (IEEE 802.11) standards and carries out transmission and reception of a packet with a network. The communication device 15 is connected to the CPU 11, for example, via a PCI express bus. Aside from the wireless LAN, a variety of standards such as a wired 1G Ethernet, a cellular communication standard that is used in a mobile telephone network (for example, LTE (Long Term Evolution)), WiMax, Bluetooth, ZigBee, Zwave, and a voice telephony communication standard can be applied to the communication device 15, as long as the standard carries out an exchange of information with a network.

The flash memory 16, for example, is a NAND flash memory 16 and stores an OS, programs such as a Web browser, and user data. The flash memory 16 is connected to the CPU 11, for example, via a SATA interface. The flash memory 16 can be substituted with other media such as a hard disc, as long as they can store data.

The battery 17 is a lithium-ion battery or the like that supplies electrical energy to the communication terminal 1.

The battery managing unit 18 provides the CPU 11 with a battery state such as a remaining battery level.

Figure 8:
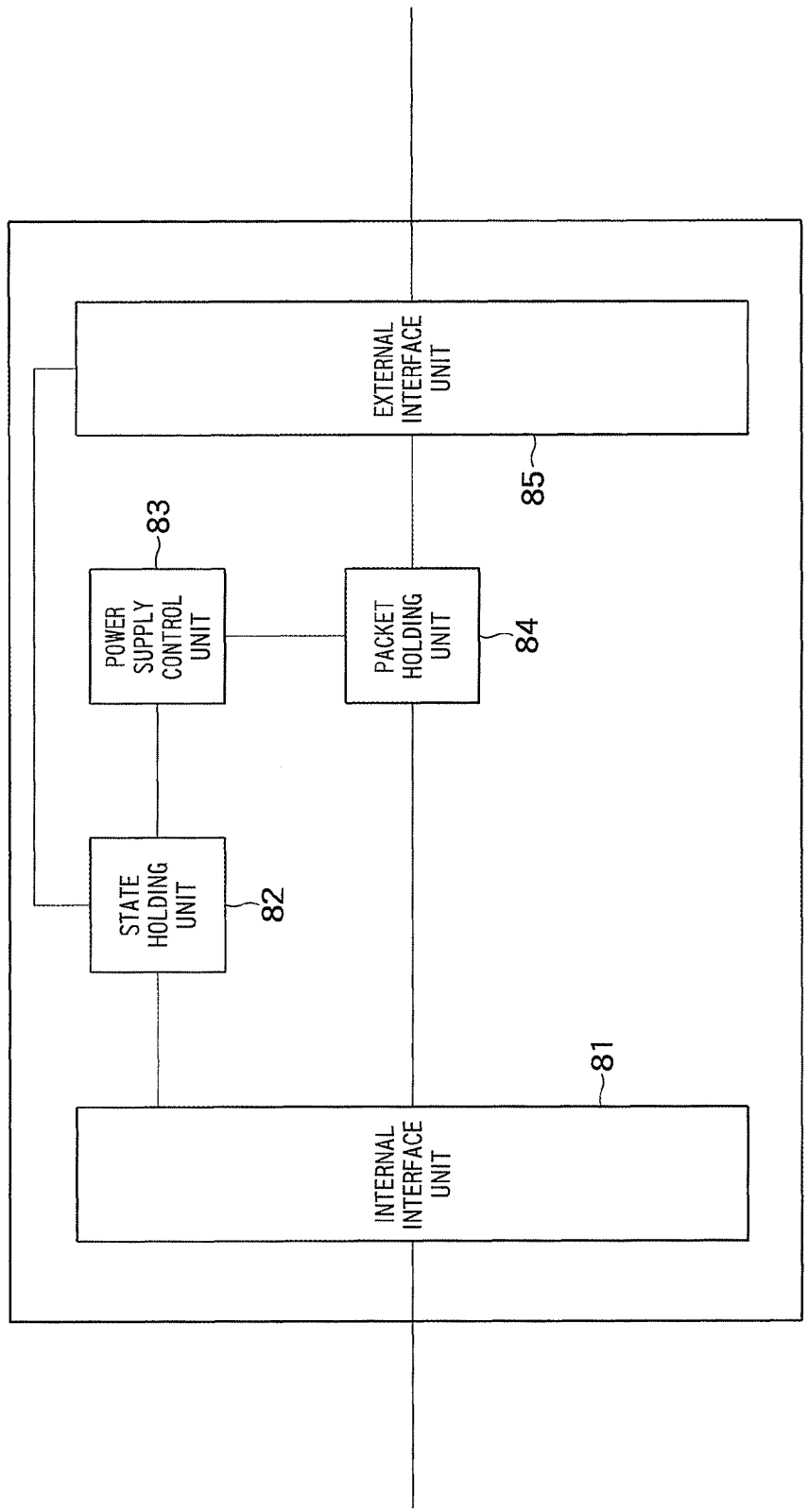
FIG. 8 shows a hardware configuration example of a communication device.

FIG. 8 shows a hardware configuration example of the communication device 15. The communication device 15 includes an internal interface unit 81, a state holding unit 82, a power supply state control unit 83, a packet holding unit 84, and an external interface unit 85.

The internal interface unit 81, for example, is a PCI-express interface and carries out information transmission and reception with the CPU 11 in accordance with PCI-express standards. In addition, feeding of power to the communication device 15 is carried out through the internal interface unit 81.

The external interface unit 85 includes a communication unit that transmits and receives a signal to and from a communication channel. In a case where a transmitting frame is present in the packet holding unit 84, the external interface unit 85 transmits this to the communication channel as an electrical signal or a radio signal. In addition, the external interface unit 85 receives an electrical signal or a radio signal from the communication channel and transmits this to the packet holding unit 84 as a receiving frame.

For use of a wireless LAN, the external interface unit 85 includes a MAC processing unit and a physical layer processing unit of IEEE 802.11. The MAC processing unit transmits a probe request through the physical layer processing unit and receives a probe response from an access point to find the access point. The MAC processing unit repeats probe request transmission and probe response reception while changing a wireless channel to specify in the physical layer processing unit, to thereby be capable of finding an access point across various wireless channels.

The MAC processing unit notifies the CPU 11 of the found access point through the internal interface unit 81. The MAC processing unit receives, from the CPU 11, a connection request that includes an SSID, a BSSID, and a wireless channel of the access point through the internal interface unit 81. The MAC processing unit transmits an association request to the access point through the physical layer processing unit and the state holding unit 82 using the specified SSID, BSSID, and wireless channel and receives an association response. With this transmission and reception of the association request and the association response, an association is established between the communication device 15 and the access point. When the association is established, the MAC processing unit sends the SSID, the BSSID, and the wireless channel to the state holding unit 82. The state holding unit 82 holds thereinside these data received from the MAC processing unit.

When a transmitting Ether frame is present in the packet holding unit 84, the MAC processing unit adds a MAC header thereto to generate an IEEE 802.11 frame. The MAC processing unit transmits this frame to the access point through the physical layer processing unit. In addition, upon receiving an IEEE 802.11 frame from the access point through the physical layer processing unit, the MAC processing unit removes a MAC header thereof to extract an Ether frame. The MAC processing unit sends this Ether frame to the packet holding unit 84. The packet holding unit 84 temporarily holds the Ether frame received from the MAC processing unit.

The packet holding unit 84 receives a transmitting packet (an Ether frame in a case of a wireless LAN) from the working memory 13 through the CPU 11 and the internal interface unit 81 and holds it. The external interface unit 85 takes this out from the packet holding unit 84 and transmits to a communication channel. In addition, upon receiving a packet from the communication channel through the external interface unit 85, the packet holding unit 84 holds this and transmits to the working memory 13 through the internal interface unit 81 and the CPU 11. In this way, the packet holding unit 84 temporarily stores a packet when a packet is exchanged between the working memory 13 and the communication channel and is used primarily to time an internal protocol and an external protocol.

The state holding unit 82 is a memory region that can be accessed from the CPU 11 and holds, for example, a plurality of register variables. As setting information of the communication device 15 is set in the state holding unit 82 from the CPU 11, a setting of the communication device 15 can be changed. In addition, the state holding unit 82 is also used to inquire of the external interface unit 85 information that pertains to a communication state. Hereinafter, examples of the register variables are shown.

| Register Names | Address | Register Size | Meaning |
| --- | --- | --- | --- |
| A | 0xFFFFFFFF | 32 bits | Power Supply State of Communication Device (D0, D1, D2, D3) |
| B | 0xFFFFFFFE | 32 bits | State of Communication Link (Up or Down) |
| C | 0xFFFFFFFD | 32 bits | Number of Transmitting Packets in Packet Holding Unit |
| D | 0xFFFFFFFC | 32 bits | Number of Receiving Packets in Packet Holding Unit |
| E | 0xFFFFFFFB | 32 bits | State of Association (Present or Absent) |
| F | 0xFFFFFFFA | 32 bits | BSSID of Access Point for Association |
| G | 0xFFFFFFF9 | 32 bits | SSID of Access Point for Association |
| H | 0xFFFFFFF8 | 32 bits | Used Wireless Channel |
| I | 0xFFFFFFF7 | 32 bits | Transmitting Radio Field Intensity |
| J | 0xFFFFFFF6 | 32 bits | Transfer Rate |
| K | 0xFFFFFFF5 | 32 bits | Number of Times to Receive Beacon |
| L | 0xFFFFFFF4 | 32 bits | Number of Receiving Packets |
| M | 0xFFFFFFF3 | 32 bits | Number of Transmitting Packets |
| N | 0xFFFFFFF2 | 32 bits | Number of Transmission-Failed Packets |

The power supply state control unit 83 sets a power supply state of the communication device 15 in accordance with a value of an "A" register of the state holding unit 82. In a case where the value of the "A" register is "0," it is set to a "D0" state, in a case of "1," it is set to a "D1" state, in a case of "2," it is set to a "D2" state, and in a case of "3," it is set to a "D3" state.

The "D0" state is a state where the communication device 15 is in operation, and both transmission and reception are allowed. The "D0" state, for example, corresponds to a first power supply state of the communication device.

The "D3" state is a state where feeding of power is completely stopped except for a function that is required at the least to return to the "D0" state. In the "D3" state, both transmission and reception is disallowed or restricted. As a specific example, feeding of power to the external interface unit 85 and the packet holding unit 84 is stopped. The state holding unit 82 brings to a state where held content in all the registers is held while reading and writing other than in the "A" register are stopped. The internal interface unit 81 stops functions other than reading and writing in the "A" register. The "D3" state, for example, corresponds to one mode of a second power supply state of the communication device. As another mode of the second power supply state, a state where transmission is allowed but reception is not allowed or a state where transmission is not allowed but reception is allowed is also possible. Power consumption is lower in the second power supply state than in the first power supply state. In addition, as another mode of the second power supply state, a state can be cited where, in a case of a communication device that establishes a data (or voice) communication channel such as the LTE, the communication channel is disconnected, feeding of power pertaining to one or both function(s) of data transmission and data reception at the communication channel is stopped, and transmission and reception of a control message such as position information registration and call information are allowed. Of course, a state where feeding of power to a function pertaining to transmission and reception of the control message can also be the second power supply state.

The "D1" and the "D2" are states in between the "D0" and the "D3," and when P(Di) is taken as consumed power in each state, $P(D0)>P(D1)>P(D2)>P(D3)$ is met. In addition, when time required to return to the "D0" from each state is expressed as T(Di), $T(D1)<T(D2)<T(D3)$ is met.

Figure 3:
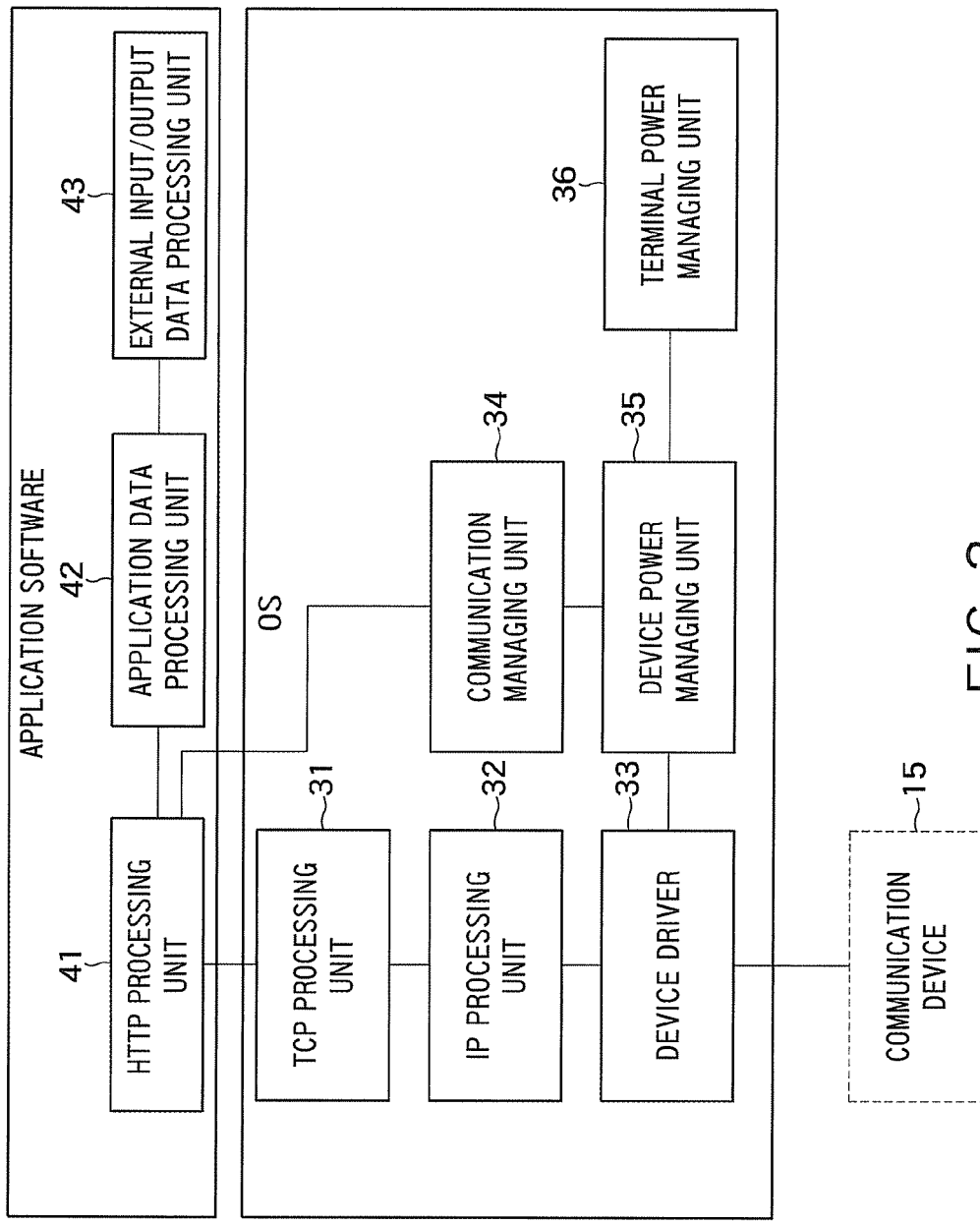
FIG. 3 shows a software configuration of the communication terminal according to the present embodiment.

FIG. 3 shows a software configuration of the communication terminal 1. In the present embodiment, the communication terminal 1 is realized as the software (program) in FIG. 3 operates on the hardware in FIG. 2. Each block shown in FIG. 3 can be realized as a program module. A program may be stored in a computer-readable storage medium (the flash memory 16 in FIG. 2). The program is read from the storage medium by a computer, expanded in a memory (the working memory 13 in FIG. 2), and executed. However, part of the software in FIG. 3 can also be realized by hardware. The software in FIG. 3 can be largely divided into an OS and application software. Of course, aside from this, a software configuration where the OS and the application software are not separated is also possible.

The OS includes a TCP processing unit (connection processing unit) 31, IP processing unit 32, a device driver 33, a communication managing unit 34, a device power managing unit 35, and a terminal power managing unit 36.

The TCP processing unit 31 establishes/releases a TCP connection by a request of the application software. In addition, the TCP processing unit 31 converts data handed from the application software into a TCP packet format to transmit to the communication terminal 2 through the IP processing unit 32 and the device driver 33. In a case where an "ACK" packet is not received from the communication terminal 2, retransmitting processing of the TCP packet is carried out. Further, the TCP processing unit 31 transmits an "ACK" packet to the communication terminal 2 for the TCP packet that has been received from the communication terminal 2. In addition, the TCP processing unit 31 extracts data from the received TCP packet and transmits to the application software.

The IP processing unit 32 converts a TCP packet received from the TCP processing unit 31 into an IP packet to transmit to the communication terminal 2 through the device driver 33. Further, the IP processing unit 32 extracts a TCP packet from an IP packet received from the communication terminal 2 and transmits to the TCP processing unit 31. Note that, although not shown in the drawing, an Ether processing unit is present between the IP processing unit 32 and the device driver 33. The Ether processing unit converts an IP packet received from the IP processing unit 32 into an Ether frame to transmit to the device driver 33. In addition, the Ether processing unit extracts an IP packet from an Ether frame received from the device driver 33 and hands to the IP processing unit 32.

The device driver 33 is software for controlling the communication device 15 in FIG. 2. The device driver 33 reads and writes data in a specified memory address, to thereby access a register of the communication device 15 and control the communication device 15 therethrough. Further, the device driver 33 sends an Ether frame received from the Ether processing unit to the communication device 15. In addition, in a case where the communication device 15 receives an Ether frame from a communication channel, the device driver 33 is executed as an interrupt is placed on the CPU 11 from the communication device 15, and the device driver 33 receives an Ether frame from the communication device 15. This exchange of an Ether frame between the communication device 15 and the device driver 33 is carried out by accessing a predetermined memory address. In the present embodiment, it is assumed that the CPU 11 of the communication terminal 1 accesses peripheral devices such as the communication device 15 and the working memory 13 using a memory mapped IO. However, it is possible to use other access methods such as a port mapped IO.

The communication managing unit 34 receives communication activity information (an HTTP session start notification and an HTTP session end notification) from an HTTP processing unit 41 of the application software. Upon receiving an HTTP session end notification, the communication managing unit 34 transmits, to the device power managing unit 35, a power supply state setting request ("D3") of the communication device 15. In addition, upon receiving an HTTP session start notification, the communication managing unit 34 transmits, to the device power managing unit 35, a power supply state setting request ("D0") of the communication device 15. Note that a "power supply state setting request (X)" is to request for the communication device to be put in a state X.

The device power managing unit 35 accesses the "A" register in accordance with a received power supply state setting request, to thereby control a power supply state of the communication device 15. Content of a power supply state setting request is decided in accordance with a detection result of a start or an end of a session by the communication managing unit 34 as described above. Accordingly, the device power managing unit 35 controls feeding of power to the communication device in accordance with a detection result of a start or an end of a session.

Note that although the device power managing unit 35 that corresponds only to the communication device 15 is provided in the present embodiment, it is also possible to provide power managing units that correspond to all components such as the external input device 14, the working memory 13, the CPU 11, and a connecting interface (PCI-Express or the like) for the above. In this case, it is possible to manage a power supply state for each component.

The terminal power managing unit 36 manages power supply states of all components including the device power managing unit 35. The terminal power managing unit 36, for example, causes the entire communication terminal 1 to transition into a sleep state and to resume an operating state from the sleep state.

The application software includes the HTTP processing unit 41, an application data processing unit 42, and an external input/output data processing unit 43.

The application data processing unit 42 carries out, on application data received from the HTTP processing unit 41, processing that is specific to that application software. In a case of a WEB browser, HTML data are received as the application data, and rendering processing (processing to generate a color of a pixel in a screen or a luminance value) is carried out using the data. Pixel data that have been generated in the rendering processing are sent to the external input/output data processing unit 43. Here, the application data can be a variety of data such as image data, dynamic image data, sound data, aside from the HTML data. The type thereof does not matter as long as they are data for rendering processing. In addition, the rendering processing includes any processing not only to generate the pixel data but also to generate data in a format in accordance with an output device in order to output the information to the outside. For example, the rendering processing includes a case where sound data are generated and a case where an LED or the like is controlled.

Further, the application data may be a program that is written in JavaScript. In that case, the application data processing unit 42 executes that program and carries out rendering processing in accordance with that result or requests a new HTTP communication from the HTTP processing unit 41. For example, Google docs by Google Incorporated is realized by a program written in JavaScript, and it operates as the program is executed in the application data processing unit 42. A program to be processed in the application data processing unit 42 does not need to be limited to ones written in JavaScript and can be written a variety of programming languages.

In a case where a need for acquiring new application data arises, the application data processing unit 42 transmits an HTTP communication request including an URL thereof. For example, such cases include a case where an embedded URL is written in the received application data or a case where necessity arises in a process of executing a program.

Further, when an external event is received from the external input/output data processing unit 43, generation of new pixel data corresponding to that or transmission of an HTTP communication request to the HTTP processing unit 41 is carried out. For example, upon receiving a mouse drag event of a scroll bar position in FIG. 7 through the external input/output data processing unit 43, the application data processing unit 42 generates pixel data that correspond to the screen scroll and sends to the external input/output data processing unit 43. Alternatively, upon receiving a mouse click event of the inbox button 84 in FIG. 7 through the external input/output data processing unit 43, the application data processing unit 42 sends, to the HTTP processing unit 41, an HTTP communication request that includes a URL for acquiring the received mail list screen in FIG. 6.

Upon receiving the pixel data from the application data processing unit 42, the external input/output data processing unit 43 displays a screen using them. For example, a screen display as shown in FIG. 7 is carried out. In addition, upon receiving an event from the outside such as a mouse click, the external interface unit 85 sends this to the application data processing unit 42.

Figure 9:
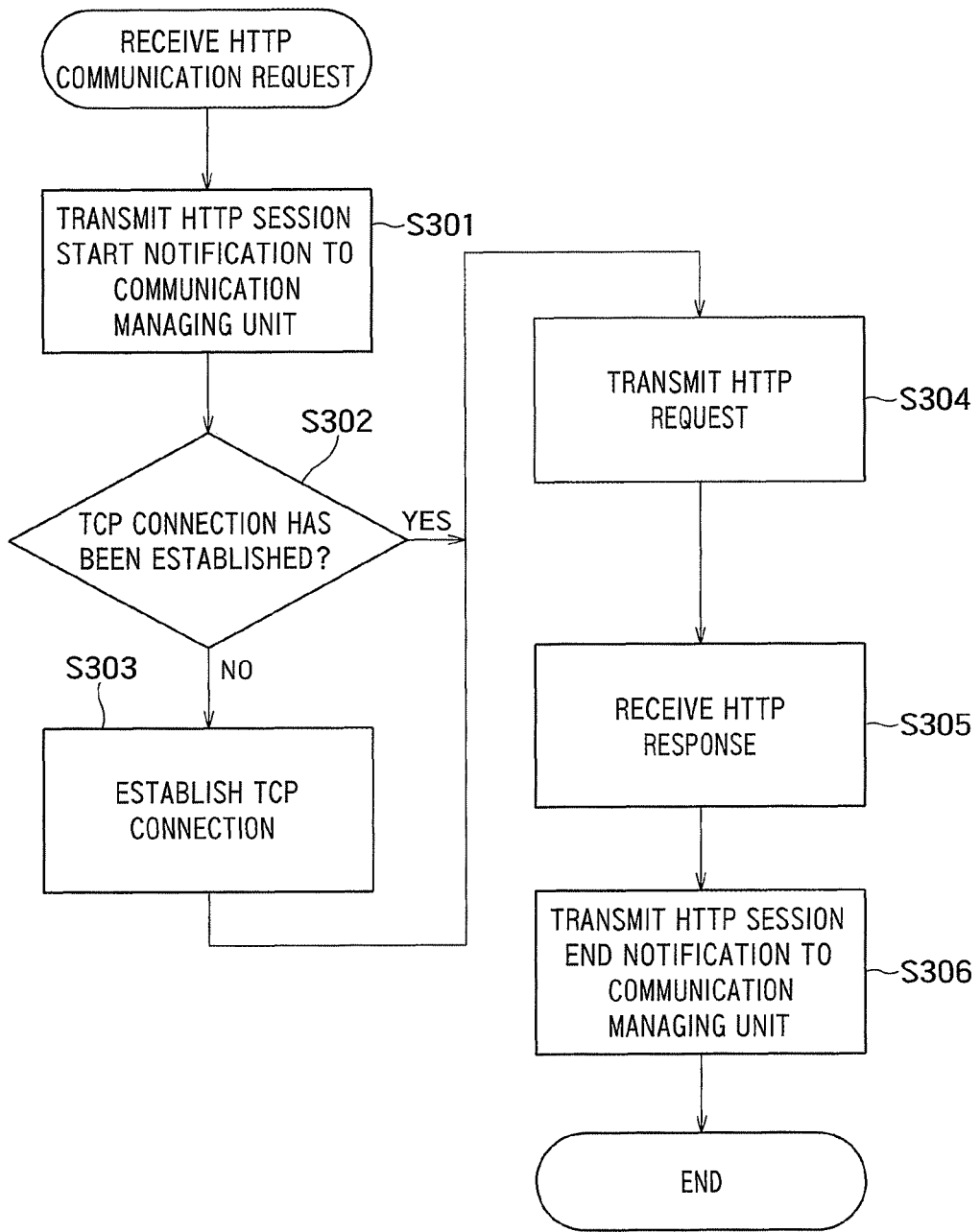
FIG. 9 shows an operation of an HTTP processing unit.

FIG. 9 shows an operation of the HTTP processing unit 41. Upon receiving an HTTP communication request from the application data processing unit 42, the HTTP processing unit 41 sends, to the communication managing unit 34, an HTTP session start notification (session identification information, process identification information, and connection identification information) (S301).

The session identification information is information for uniquely identifying an HTTP session in the application software, and presence of this information makes it possible to use a plurality of HTTP sessions in single application software. The process identification information is information for identifying a process of the application software (in a case of UNIX). As an HTTP session start notification has a pair of (the session identification information and the process identification information) in this way, it becomes possible to uniquely identify an HTTP session in the communication terminal 1.

Further, the connection identification information is information for identifying a TCP connection which an HTTP session uses, and a socket number that is returned by the OS on a "socket( )" system call can, for example, be used. However, when a TCP connection which that HTTP session uses has not been established, an invalid value such as 0 is set.

Subsequently, a designation address within the URL included in the HTTP communication request and presence/absence of establishment of a TCP connection with respect to a port number are confirmed (S302), and in a case where a TCP connection is not established, a TCP connection is established (S303).

Subsequently, an HTTP request is transmitted using the TCP connection (S304), and an HTTP response thereto is received (S305). When an HTTP response is received, an HTTP session end notification (the session identification information, the process identification information, and the connection identification information) is sent to the communication managing unit 34 (S306). At this time, in the connection identification information of the HTTP session end notification, information such as a socket number for identifying a TCP connection used for the HTTP session is indicated.

In this way, according to the present embodiment, it becomes possible to reduce power consumption of the communication terminal by putting a power supply state of the communication device 15 to a state ("D3") where power consumption is lower than in an operating state ("D0") in a case where the application software is not carrying out communication. Further, when communication is required, the power supply state of the communication device 15 can immediately be returned to an operation state ("D0") where a communication operation is allowed, and thus an unnecessary delay pertaining to communication can be prevented, whereby the convenience for the user is not lost.

(Application to Protocol other than HTTP)

So far, a WEB browser is assumed as the application software, it is possible to use other application software or a protocol other than the HTTP.

For example, in a case where the application software is mail software instead of a WEB browser, POP3 (mail reception) and SMTP (mail transmission) are used as protocols. Either of the protocols uses a TCP connection. The POP3 establishes a TCP connection of a designation port number 110 and receives a mail using the following commands on this TCP connection (<>is a parameter for a command).

USER<user name>: User Name
PASS<password >: Password
LIST: Received Mail List Request
TOP<message number><line number>: Mail Content Request of Number to Follow
RETR<message number>: Message Acquiring Request
DELE<message number>: Mail Delete Marking Request
QUIT: Transmission of Update (Reflect Update) of Session Close Request Specifically, the mail software carries out user authentication with the USER command and the PASS command after the TCP connection is established. After the authentication, a list of received mails (message numbers and data sizes) is acquired with the LIST command. With the TOP command, a mail is specified by a message number, and further, data for the specified number of lines are acquired. By executing the TOP command that specifies each of the mails in the mail list acquired with the LIST command, a received mail list screen similar to FIG. 6 can be displayed. While a user is searching for a mail to read, a power supply state of the communication device 15 is put in "D3" with the TCP connection being kept established, whereby power consumption of the communication terminal can be reduced. When the user selects a mail to read, the power supply state of the communication device 15 is put in "D0," and an entire mail message which the user has selected is acquired by transmitting the RETR command using the TCP connection. After acquisition, the power supply state of the communication device 15 is changed to "D3," and a screen in FIG. 7 is displayed.

This operation will be described using FIG. 3. In place of the HTTP processing unit 41, an SMTP processing unit and a POP processing unit are provided. Each of the SMTP processing unit and the POP processing unit sends, to the communication managing unit 34, communication activity information ((an SMTP session start notification, an SMTP session end notification), (a POP session start notification, a POP session end notification)).

Upon receiving a session start request from the application software, the communication managing unit 34 sends, to the device power managing unit 35, a power supply state setting request ("D0") of the communication device 15.

In addition, upon receiving a session end request for all of the received session start requests, the communication managing unit 34 sends, to the device power managing unit 35, a power supply state setting request ("D3") of the communication device 15.

(Plurality of Applications)

Figure 11:
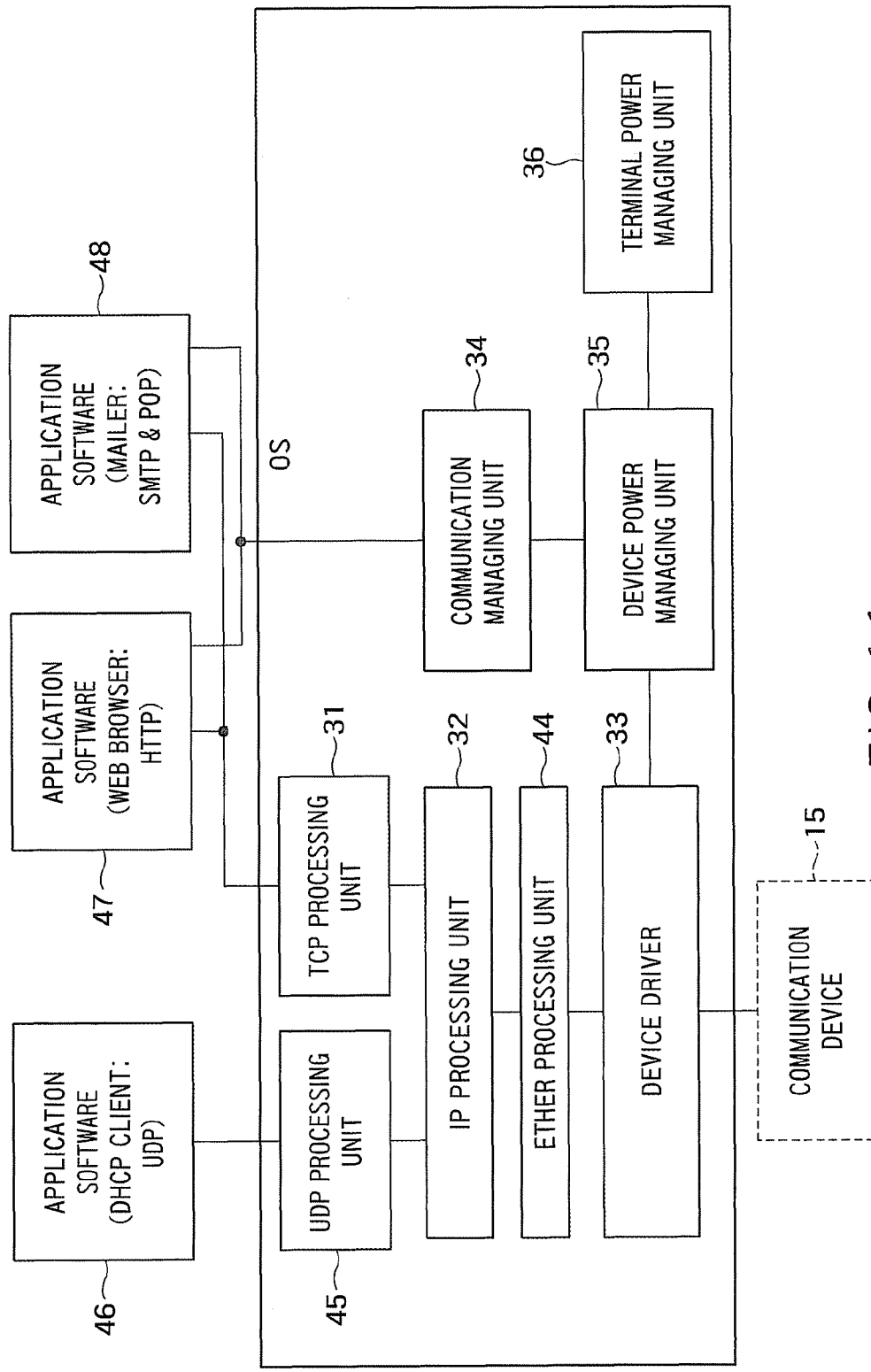
FIG. 11 shows a software configuration in a case where two applications of a WEB browser and mail software are executed.

Although only one piece of application software is indicated in FIG. 3, a plurality of pieces of application software may be executed. For example, a case where a Web browser and mail software are executed as the application software is considered (FIG. 11). In FIG. 11, aside from a WEB browser 47 and a mailer 48, a DHCP client 46 is also depicted as an example of the application.

In this case, the communication managing unit 34 receives a (Web/POP/SMTP) session start notification as communication activity information and sends a power supply state setting request ("D0") in a case where the power supply state of the communication device 15 is other than "D0." When a (Web/POP/SMTP) session end notification is received as communication activity information from the WEB browser 47 or the mailer 48, a power supply state setting request ("D3") is sent in a case where there is no session that has not ended (that is, in a case where all the sessions have ended). This presence/absence of a session that has not ended can be determined by matching a session start notification and a session end notification using (session identification information, process identification information) included in the communication activity information.

In addition, in this example, the communication managing unit 34 sends a power supply state setting request to the device power managing unit 35 with respect to all the TCP connections based on the activity information thereof. However, a modification can be made in that a power supply state setting request is sent to the device power managing unit 35 with respect to only a part of the TCP connections based on the activity information thereof.

FIG. 11 shows a state where the DHCP client 46 carries out communication not through the TCP processing unit 31 but through a UDP processing unit 45. Unlike the TCP processing unit 31, the UDP processing unit 45 does not carry out connection type communication, and further, the communication managing unit 34 does not manage the communication activity thereof.

In addition, in FIG. 11, an Ether processing unit 44 that is omitted in FIG. 3 is also depicted. The Ether processing unit 44 encapsulates an IP packet received from the IP processing unit 32 into an Ether frame format and transmits to the device driver 33. In addition, upon receiving an Ether frame from the device driver 33, the Ether processing unit 44 extracts an IP packet included therein and transmits to the IP processing unit 32. The Ether processing unit 44 holds an ARP table, and searches for a designation address of the Ether frame based on an IP address of a next hop node in an IP packet. Here, in a case where a designation address of an IP packet is present within the same subnet as the terminal itself, the next hop node is the designation node thereof, and in other cases, the next hop node is a router to which this IP packet is to be forwarded. In a case where an entry that corresponds to the IP address is not present in the ARP table, a designation Ether address is obtained using a method called an ARP solution. A procedure for this ARP solution is as follows. First, the terminal itself multicasts or broadcasts, within the subnet, an ARP request packet that includes an IP address of the next hop node, and the next hop node that has received this transmits an ARP response packet in which the Ether address thereof is indicated. The terminal itself extracts the Ether address of the next hop node that is indicated in this ARP response packet, uses as the designation Ether address, and registers the Ether address thereof in the ARP table.

(Transmission of ZEROWINDOW)

So far, the description is given assuming so-called server-client type communication in which a client such as a WEB browser or mail software transmits a request to a server and the server transmits a response to the client, but other modes of communication are also possible.

For example, as in a case where Websocket (IETF RFC 6455) is used, there exists a mode where a server transmits data without a request from a client. In this case, when the state of the communication device 15 is changed from "D0" to D3," it is desirable that the communication terminal 1 transmits, to the communication terminal 2, a reception disallowed notification with respect to an established TCP connection.

In the TCP protocol, if the communication terminal 2 transmits a packet when the communication terminal 1 cannot receive a packet, the communication terminal 2 detects a loss of the transmitting packet, and thus a flow control function of the communication terminal 2 causes a transmission allowed rate to decrease. Thus, by transmitting a reception disallowed notification prior to transitioning to "D3" from "D0," the transmission allowed rate of the communication terminal 2 can be retained at a high value. Through this, when the communication terminal 1 transmits an HTTP request, the communication terminal 2 can transmit an HTTP response at a high rate. That is, an increase in a delay from transmission of an HTTP request to reception of an HTTP response in the communication terminal 1 can be prevented, and thus the convenience for the user can be prevented from being lost.

Here, in the TCP protocol, a receiving side notifies a transmitting side of a data size that can be received. Therefore, if a notification as to a data size that can be received being zero (TCP Zerowindow) is made, data communication from the communication terminal 2 to the communication terminal 1 can be suppressed. A notification of TCP Zerowindow at this time corresponds to a reception disallowed notification.

Figure 10:
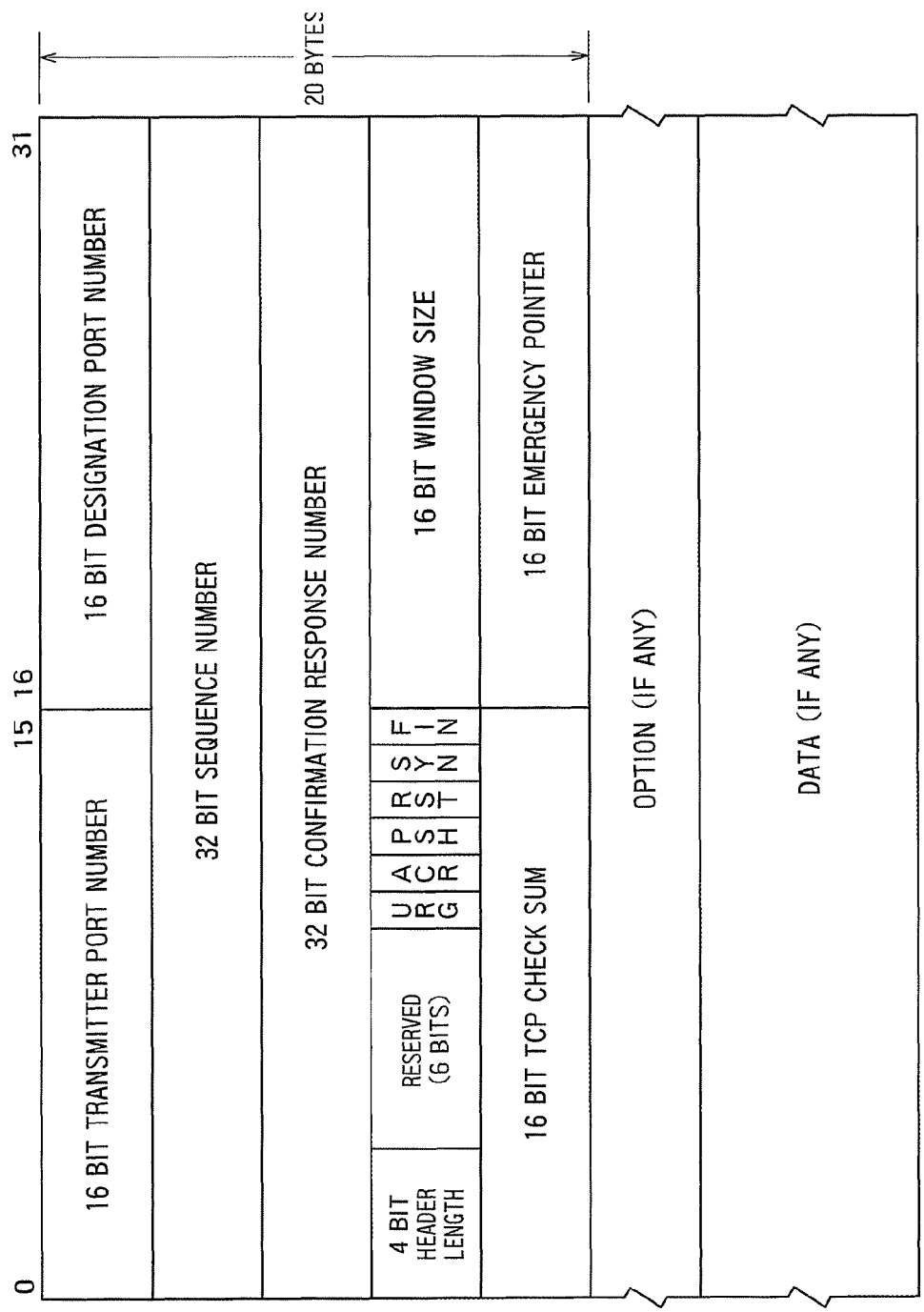
FIG. 10 shows a configuration of a TCP header.

FIG. 10 shows a configuration of a TCP header. The notification of TCP Zerowindow is that "16 bit window size" in FIG. 10 indicates a value of zero. A transmitter port number and a receiver port number indicate values that correspond to the established TCP connection. Further, a confirmation response number indicates a value that corresponds to data which have already been received without a miss. The "ACK" flag is built (set to 1).

Using FIG. 3, the above operation will be described. The communication managing unit 34 sends a transmission request for a TCP Zerowindow notification to the TCP processing unit 31 before sending a power supply state setting request ("D3") to the device power managing unit 35.

The TCP processing unit 31 that has received this extracts an established TCP connection from TCP connection information managed by itself and transmits a TCP Zerowindow notification to each of the TCP connections. At this time, as the TCP processing unit 31 transmits a plurality of TCP Zerowindow notifications for each connection, probability of the TCP Zerowindow notification reaching a communication terminal on another end can be improved.

Thereafter, the communication managing unit 34 sends a power supply state setting request ("D3") to the device power managing unit.

Upon receiving a session start notification from any of the application software, the communication managing unit 34 sends a power supply state setting request ("D0") to the device power managing unit 35. At this time, it is desirable that the communication managing unit 34 notifies the TCP processing unit 31 of the above. The TCP processing unit 31 that has received this becomes capable of notifying the communication terminal on another end of being in the reception allowed state with respect to the established TCP connection.

Here, the notification of the reception allowed state can be implemented by transmitting a TCP packet where a window size in FIG. 10 is 1 or more. However, it is desirable that the window size is set in accordance with a data size that can be received. Through this, the communication terminal 1 can receive a packet that has been prevented from being transmitted at the communication terminal on another end. In a case where data are transmitted from a server without a request from the communication terminal 1 (for example, an event notification from the server using websocket), the server does not carry out the event notification until the terminal carries out a notification of a communication allowed state, and the server carries out event transmission only at a timing at which the terminal carries out a notification of the reception allowed state. In this way, since the communication terminal 1 can carry out reception at its own desired timing, power consumption of the communication terminal 1 can be reduced. In particular, in a case where a display device which the communication terminal 1 has is put in a low power consumption state (for example, a state where backlight is turned off and the display is not displayed) due to a decrease in user activity, event information from the server does not need to be received. It is desirable that the display is put in a display state when the user operates the communication terminal 1 and at the same time a notification of the reception allowed state is carried out.

(Delay in Transition to "D0" State)

When a session start notification is received from the application software, the communication managing unit 34 can delay transmission of a power supply state setting request ("D0") until another session start notification is received. Through this, start timings of a plurality of communication sessions can be synchronized, and time in which the communication device 15 is in the "D0" state can be reduced. Thus, power consumption can be reduced.

Here, the communication managing unit 34 can, instead of always waiting for a second session start request, wait for transmission of a power supply state setting request ("D0") for a predetermined permitted delay time after receiving a first session start request.

Alternatively, the application software can set this permitted delay time to include in a session start request, and the communication managing unit 34 can delay transmission of a power supply state setting request ("D0") by this permitted delay time.

Further, this permitted delay time may be set to a larger value as a remaining electricity level in the battery 17 held by the communication terminal 1 is lower. Through this, power consumption can be further reduced when a remaining battery level is lower.
(Transition to "D0" State Using Timer)

It is desirable that the communication managing unit 34 sends a power supply state setting request ("D0") even when a session start request is not received, in a case where a predetermined period elapses after transmitting a power supply state setting request ("D3"). For example, it is desirable to send a power supply state setting request ("D0") at a predetermined cycle. Through this, the communication terminal 1 becomes capable of communication such as transmission of a UDP packet or an ARP request packet which the communication managing unit does not manage. When a predetermined period elapses after transitioning to "D0," it is desirable to send a power supply state setting request ("D3") and return to "D3."

Further, in a case where a Websocket is used, when the communication device 15 comes into the "D0" state, a communication terminal on another end is notified of being in the reception allowed state, and a packet can be received from the terminal on another end.

In addition, in a case where a transmission request of a packet pertaining to communication which the communication managing unit 34 does not manage occurs when the communication device 15 is in the "D3" state, it is desirable to do as follows. That is, it is desirable that the communication managing unit 34 puts in a power supply state setting request ("D0") even when a session start request is not received when a predetermined period elapses after that packet transmission request occurs.

At this time, a distinct waiting time may be set in advance in each of these packets other than the TCP. In this case, it is also possible to send a power supply state setting request ("D0") when the waiting time corresponding to that packet elapses after the packet transmission request occurs. In this case, it is desirable that the communication managing unit 34 sends a power supply state setting request ("D3") after a predetermined period further elapses. In that case, it is desirable to also carry out a TCP Zerowindow notification.
(Refresh of ARP Cache)

Suppose the Ethernet or the wireless LAN is used as the communication device 15. In this case, a router that belongs to the same subnet as the communication terminal 1 transmits, to the communication terminal 1, an Ether frame for the communication terminal 1 using a MAC address of the communication terminal 1.

The router transmits, to the subnet, an ARP request in which an IP address of the communication terminal 1 is indicated. In response to this request, the communication terminal 1 returns an ARP response in which its own MAC address is indicated. Through this, the router knows the MAC address of the communication terminal 1.

The MAC address that has once been acquired is held in the router for a predetermined period and then discarded. If the router receives a packet that is addressed to the communication terminal 1 after discarding the MAC address of the communication terminal 1 that has been held, the router again transmits an ARP request in order to acquire the MAC address of the communication terminal 1.

At this time, however, if the communication device 15 of the communication terminal 1 is in the "D3" state, the communication terminal 1 cannot respond to this ARP request. Thus, the router cannot forward the packet to the communication terminal 1 and replies to the sender of the packet through, for example, an "ICMP No Route Host" message. When the "ICMP No Route Host" message arrives at the communication terminal on another end to which a TCP connection is established with the communication terminal 1, there is a possibility that the communication terminal on another end discards the TCP connection. Accordingly, it is desirable that, in the "D3" state, the communication terminal 1 transitions to the "D0" state for each predetermined period, and an announcement packet such as an "ARP Announcement" message (RFC 3972) is transmitted. The "ARP Announcement" message includes the MAC address (a hardware address of the communication device) and the IP address of the communication terminal 1. Through this, the router can match and learn the MAC address of the communication terminal 1 with the IP address of the communication terminal 1 and update the ARP table. Accordingly, the MAC address of the communication terminal 1 is not discarded within the router and is retained. It is desirable to return to the original "D3" state after transmission of the "ARP Announcement" message or after a predetermined period elapses after a transition to the "D0" state. Here, although a transition is made to the "D0" state in order to transmit an announcement packet, in a case where a response to the announcement packet is not necessary, a transition to at least a state where transmission is allowed (a third power supply state) may be made. In the third power supply state, reception may or may not be allowed. It is desirable for the Ether processing unit 44 to carry out transmission of this "ARP Announcement" message in the example in FIG. 11.
(Method for Grasping Communication Activity)

So far, the communication managing unit 34 receives communication activity information from the application software, but it is also possible to receive this communication activity information from the device driver 33, the IP processing unit 32, or the TCP processing unit 31. In this case, by equipping the device driver 33, the IP processing unit 32, or the TCP processing unit 31 with a function to analyze a session request and a session response, the communication managing unit 34 can carry out processing similar to the above.

Alternatively, the communication managing unit 34 may infer the communication activity information based on presence/absence of transmission and reception of a packet. Through also this, the communication managing unit 34 can carry out processing similar to the above.
(Connection other than TCP Connection)

So far, the description is given taking the TCP connection as an example, but it is also possible to target a connection other than the TCP connection. Here, connection type communication refers to a communication mode where a transmitting terminal and a receiving terminal that are in communication hold therebetween a state for the communication, and establishing a connection refers to establishing the state for the communication in the transmitting and receiving terminals. In the case of the TCP, a state for the communication is established by carrying out a three-way handshake to exchange "SYS," "SYSNACK," and "ACK" messages between transmitting and receiving terminals.

As another connection, an IPSEC (Security Architecture for Internet Protocol) connection of IPSEC communication can, for example, be cited. In the IPSEC communication, a state called a security association is maintained between transmitting and receiving terminals. This means that the IPSEC communication carries out connection type communication similarly to the TCP. To establish this security association, an IKE (Internet Key Exchange) protocol is typically used. This protocol has a large number of messages to be processed, and there is a case where public key cryptography processing is included in processing or the like, and thus a processing load is high. Therefore, when reestablishing an IPSEC connection (security association), an establishing processing delay is large, and power consumption due to a processing load is large.

Thus, the communication device 15 is transitioned into the "D3" state with the IPSEC connection (security association) being maintained when there is no transmitting or receiving packet and is returned to the "D0" only at the time of communication. Through this, maintaining the convenience and reducing power consumption can both be achieved.

In addition, when the communication device 15 is in the "D3" state and a software expiration of the security association is reached even without a communication, the communication device may be returned to the "D0", and a renegotiation of the security association may be carried out with the terminal on another end to maintain the connection. Thereafter, it is desirable to transition into the "D3".

In the example of the above-described IPSEC connection, the description is given assuming a transport mode of the IPSEC, but it is also possible to target a tunnel mode of the IPSEC. In that case, in a case where a packet transported by a tunnel is a TCP connection, it is desirable to transition the state of the communication device 15 to "D3" from "D0" while the IPSEC tunnel (connection) and the TCP connection are both maintained. Of course, in a case where the state of the communication device 15 is changed from "D3" to "D0" for renegotiation of a security association of the IPSEC tunnel, it is desirable to notify the TCP connection as well of the change. Through this, a TCP packet can be received from the terminal on another end.

Note that the above-described IPSEC tunnel is an example, and it is also possible to target another tunnel. Specifically, a variety of other tunnel protocols such as a GRE (Generic Routing Encapsulation) tunnel, an L2TP (Layer 2 Tunneling Protocol) tunnel, or a PPTP (Point-to-Point Tunneling Protocol) are possible.

In addition, the present embodiment can be applied to a protocol called SPDY (http://dev.chromium.org/spdy/spdy-whitepaper). In the SPDY, a plurality of HTTP sessions operates on a single TCP connection. In a case where all HTTP sessions finish receiving HTTP responses, the communication device 15 transitions to the "D3" state from the "D0" state with the TCP connection kept being established. When an HTTP request is outputted in any of the HTTP sessions, the communication device 15 is returned to the "D0" state.

In addition, the present invention can be applied even in a mode where a packet that belongs to a certain communication connection is transferred via another communication connection, as in "TCP over TCP over GRE over IPSEC." That is, the communication managing unit 34 may detect establishment/disconnection of all connections or of a connection specified in advance and transmit, to the device power managing unit 35, a power supply state setting request in accordance therewith. In this case, it is desirable to transmit one or both of a reception disallowed notification and a reception allowed notification to all the established connections.

(Cooperation with User Operating Activity)

A state control according to the present embodiment can be put in cooperation with operation information by a user. For example, in FIG. 3, when the OS receives a user event from the outside, it is also possible to transition the communication device 15 from the "D3" state to the "D0" state.

For example, in a case where a user does not operate the communication terminal 1 for a predetermined period, a liquid crystal display included in the communication terminal 1 is transitioned into a low power consumption state by turning off a backlight or the like. At this time, the communication device 15 is put in the "D3" state. Then, the backlight of the liquid crystal display is thereafter turned on as a user touches a touch panel or the like, and the communication device 15 is put in the "D0" state when a screen is presented to the user.

This enables to transmit and receive a UDP or DHCP packet, and presence/absence of a peripheral printer or a UPnP device can be displayed on the liquid crystal display. When a screen is not displayed to the user, an operation for finding a device or a service as such is not necessary. Thus, when a screen is not displayed, power consumption can be reduced by putting the communication device 15 in the "D3" state. In addition, by putting the communication device 15 in the "D0" state at a timing at which a screen is displayed to the user, a waiting time for providing a user with a communication service can be reduced. Thus, the convenience for the user and the lower power consumption can both be achieved.

In the above-described example, an operation of a touch panel is treated as an external event, but aside from that, it is also possible to use sensing information obtained with a sensor other than the communication device. For example, a frequency of pressing a button, a change in brightness of the surroundings detected by an illuminance sensor, a volume of sound detected by a microphone, or a remaining battery level can also be used.

(Proper Use of Power Saving States)

So far, the state of the communication device 15 is described mainly by dividing into two states of "D0" and "D3." Here, a case where there are three power saving states including "D1" and "D2" as a power saving state aside from the "D3" state is considered. Communication is not allowed in "D1," "D2," and "D3." Power consumption decreases in the order of "D1," "D2," and "D3," and time required to return to "D0" increases in that order.

In such a case, the following operation is possible. For example, using the "D1" state in place of the above-described "D3" and using the "D0" and "D1" states, the above-described operation is carried out. In a case where a period when remaining in the "D1" state is equal to or longer than a predetermined period, a transition is made to the "D2" state from the "D1" state. Further, after a predetermined period elapses without returning to "D0," a transition is made to the "D3" state from the "D2" state. Through this, in a case where communication is frequently carried out, time it takes to return to "D0" can be shortened, and the waiting time for the user can be reduced.

(Other)

In the present embodiment, the description is given taking a case where IPv4 communication is carried out as an example, but without being limited thereto, the present embodiment can also be applied to a variety of packet communication such as IPv6 and X.25.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In addition, a variety of modifications can be considered aside from those where a control of the communication device and a notification as to the communication disallowed state and the communication allowed state are always carried out as shown in the present embodiments. For example, they can be carried out only in a case where a display device is in a non-display state. Alternatively, they can be carried out only in a case where there is a request from an application to an OS or only in a case where an application set in advance is running.

The invention claimed is:

1. A communication terminal, comprising:
a communication device configured to communicate with a network;
a connection processing unit, implemented by a processor, configured to establish a connection with a first communication terminal on the network;
a communication managing unit, implemented by a processor, configured to detect a start and an end of a session on the connection; and
a device power managing unit, implemented by a processor, configured to control feeding of power to the communication device in accordance with a detected result by the communication managing unit,
wherein the device power managing unit sets the communication device in a first power supply state where transmission and reception are allowed when a start of the session is detected, and sets the communication device in a second power supply state where at least one of transmission and reception is disallowed when an end of the session is detected,
the device power managing unit sets the communication device in the first power supply state when a permitted delay time elapses after a start of the session is detected, and
the permitted delay time is set to a larger value as a remaining battery level is lower.

2. The communication terminal according to claim 1,
wherein the second power supply state is a state where the communication device is at least disallowed to receive, and
wherein, when an end of the session is detected, the connection processing unit sends, before the communication device is set in the second power supply state, a reception disallowed notification notifying that reception is not allowed on the connection, to the first communication terminal.

3. The communication terminal according to claim 2,
wherein when the device power managing unit sets the communication device in the first power supply state, the connection processing unit sends a reception allowed notification notifying that reception is allowed on the connection to the first communication terminal.

4. The communication terminal according to claim 1, further comprising:
a display device,
wherein the device power managing unit controls feeding of power to the communication device in a case where the display device is not in a display state.

5. The communication terminal according to claim 1,
wherein the connection is a connection by TCP, IPSEC, L2TP, PPTP, HTTP or SPDY.

6. A communication terminal comprising:
a communication device configured to communicate with a network;
a connection processing unit, implemented by a processor, configured to establish a connection with a first communication terminal on the network;
a communication managing unit, implemented by a processor, configured to detect a start and an end of a session on the connection; and
a device power managing unit, implemented by a processor, configured to control feeding of power to the communication device in accordance with a detected result by the communication managing unit,
wherein the device power managing unit sets the communication device in a first power supply state where transmission and reception are allowed when a start of the session is detected, and sets the communication device in a second power supply state where at least one of transmission and reception is disallowed when an end of the session is detected,
wherein the communication terminal further comprises:
a protocol processing unit, implemented by a processor, configured to process a protocol that is different from that processed in the connection processing unit,
wherein the device power managing unit transitions the communication device to the first power supply state at a predetermined cycle temporarily after the communication device is set in the second power supply state,
wherein the protocol processing unit carries out packet communication of the protocol after the communication device is transitioned to the first power supply state, and
wherein the device power managing unit returns the communication device to the second power supply state when the packet communication ends or when a predetermined period elapses after a transition to the first power supply state.

7. The communication terminal according to claim 6,
wherein the second power supply state is a state where the communication device is at least disallowed to transmit,
wherein the device power managing unit transitions the communication device to a third power supply state where at least transmission is allowed at a predetermined cycle temporarily after the communication device is set in the second power supply state,
wherein the protocol processing unit transmits an announcement packet that includes a hardware address and an IP address of the communication device after the communication device is transitioned to the third power supply state, and
wherein the device power managing unit returns the communication device to the second power supply state when transmission of the announcement packet ends or when a predetermined period elapses after a transition to the first power supply state.

8. A communication terminal comprising:
a communication device configured to communicate with a network;
a connection processing unit, implemented by a processor, configured to establish a connection with a first communication terminal on the network;
a communication managing unit, implemented by a processor, configured to detect a start and an end of a session on the connection; and
a device power managing unit, implemented by a processor, configured to control feeding of power to the communication device in accordance with a detected result by the communication managing unit,
wherein the device power managing unit sets the communication device in a first power supply state where transmission and reception are allowed when a start of the session is detected, and sets the communication device in a second power supply state where at least one of transmission and reception is disallowed when an end of the session is detected,
wherein the communication terminal further comprises:

a protocol processing unit, implemented by a processor, configured to process a protocol that is different from that processed in the connection processing unit, wherein, when the communication device is set in the second power supply state, the device power managing unit transitions the communication device to the first power supply state upon detecting a packet communication request by the protocol processing unit, wherein the protocol processing unit carries out the packet communication after the communication device is transitioned to the first power supply state, and wherein the device power managing unit returns the communication device to the second power supply state after the packet communication ends or when a predetermined period elapses after a transition to the first power supply state.

9. The communication terminal according to claim 8, wherein the device power managing unit transitions the communication device to the first power supply state when a predetermined period elapses after the packet communication request is detected.

10. A communication method executed by a computer, the method comprising:
   establishing a connection with a first communication terminal on a network by use of a communication device;
   detecting a start and an end of a session on the connection; and
   controlling feeding of power to the communication device in accordance with a detection result of a start and an end of a session on the connection, the communication device being set in a first power supply state where transmission and reception are allowed when a start of the session is detected, the communication device being set in a second power supply state where at least one of transmission and reception is disallowed when an end of the session is detected, and the communication device being set in the first power supply state when a permitted delay time elapses after a start of the session is detected, the permitted delay time being set to a larger value as a remaining battery level is lower.

11. A non-transitory computer readable medium having instructions stored therein which, when executed by a computer, cause the computer to perform processing comprising:
   establishing, a connection with a first communication terminal on a network by use of a communication device;
   detecting a start and an end of a session on the connection; and
   controlling feeding of power to the communication device in accordance with a detection result of a start and an end of a session on the connection, the communication device being set in a first power supply state where transmission and reception are allowed when a start of the session is detected, the communication device being set in a second power supply state where at least one of transmission and reception is disallowed when an end of the session is detected, and the communication device being set in the first power supply state when a permitted delay time elapses after a start of the session is detected, the permitted delay time being set to a larger value as a remaining battery level is lower.

12. A communication method executed by a computer, comprising:
   establishing a connection with a first communication terminal on a network by use of a communication device;
   detecting a start and an end of a session on the connection;
   controlling feeding of power to the communication device in accordance with a detection result of a start and an end of a session on the connection;
   processing a protocol that is different from that used in the establishing of a connection;
   setting the communication device in a first power supply state where transmission and reception are allowed when a start of the session is detected, and setting the communication device in a second power supply state where at least one of transmission and reception is disallowed when an end of the session is detected;
   transitioning the communication device to the first power supply state at a predetermined cycle temporarily after the communication device is set in the second power supply state;
   carrying out packet communication of the protocol after the communication device is transitioned to the first power supply state; and
   returning the communication device to the second power supply state when the packet communication ends or when a predetermined period elapses after a transition to the first power supply state.

13. A communication method executed by a computer, comprising:
   establishing a connection with a first communication terminal on a network by use of a communication device;
   detecting a start and an end of a session on the connection;
   controlling feeding of power to the communication device in accordance with a detection result of a start and an end of a session on the connection;
   processing a protocol that is different from that used in the establishing of a connection;
   setting the communication device in a first power supply state where transmission and reception are allowed when a start of the session is detected, and setting the communication device in a second power supply state where at least one of transmission and reception is disallowed when an end of the session is detected;
   transitioning the communication device to the first power supply state upon detecting a packet communication request by the processing of the protocol when the communication device is set in the second power supply state;
   carrying out the packet communication after the communication device is transitioned to the first power supply state; and
   returning the communication device to the second power supply state after the packet communication ends or when a predetermined period elapses after a transition to the first power supply state.

14. A non-transitory computer readable medium having instructions stored therein which, when executed by a computer, cause the computer to perform processing comprising:
   establishing a connection with a first communication terminal on a network by use of a communication device;
   detecting a start and an end of a session on the connection;
   controlling feeding of power to the communication device in accordance with a detection result of a start and an end of a session on the connection;
   processing a protocol that is different from that used in the establishing of a connection;
   setting the communication device in a first power supply state where transmission and reception are allowed when a start of the session is detected, and setting the communication device in a second power supply state where at least one of transmission and reception is disallowed when an end of the session is detected;

transitioning the communication device to the first power supply state at a predetermined cycle temporarily after the communication device is set in the second power supply state;

carrying out packet communication of the protocol after the communication device is transitioned to the first power supply state; and returning the communication device to the second power supply state when the packet communication ends or when a predetermined period elapses after a transition to the first power supply state.

15. A non-transitory computer readable medium having instructions stored therein which, when executed by a computer, cause the computer to perform processing comprising:

establishing a connection with a first communication terminal on a network by use of a communication device;

detecting a start and an end of a session on the connection;

controlling feeding of power to the communication device in accordance with a detection result of a start and an end of a session on the connection;

processing a protocol that is different from that used in the establishing of a connection;

setting the communication device in a first power supply state where transmission and reception are allowed when a start of the session is detected, and setting the communication device in a second power supply state where at least one of transmission and reception is disallowed when an end of the session is detected;

transitioning the communication device to the first power supply state upon detecting a packet communication request by the processing of the protocol when the communication device is set in the second power supply state;

carrying out the packet communication after the communication device is transitioned to the first power supply state; and returning the communication device to the second power supply state after the packet communication ends or when a predetermined period elapses after a transition to the first power supply state.

* * * * *